United States Patent
Lunt et al.

(10) Patent No.: US 7,440,552 B2
(45) Date of Patent: Oct. 21, 2008

(54) FAULT DETECTION METHOD AND APPARATUS FOR TELEPHONE LINES

(75) Inventors: Nicholas Lunt, Ipswich (GB); Paul Birdsall, Ipswich (GB); Michael W Beckford, Derby (GB); Andrew D Chattel, Ipswich (GB)

(73) Assignee: British Telecommunications public limited company, London (GB)

( * ) Notice: Subject to any disclaimer, the term of this patent is extended or adjusted under 35 U.S.C. 154(b) by 587 days.

(21) Appl. No.: 10/507,115

(22) PCT Filed: Mar. 27, 2003

(86) PCT No.: PCT/GB03/01359

§ 371 (c)(1),
(2), (4) Date: Sep. 10, 2004

(87) PCT Pub. No.: WO03/084198

PCT Pub. Date: Oct. 9, 2003

(65) Prior Publication Data

US 2005/0141673 A1   Jun. 30, 2005

(30) Foreign Application Priority Data

Mar. 28, 2002   (EP) .................. 02252351

(51) Int. Cl.
*H04M 1/24* (2006.01)
*H04M 3/08* (2006.01)
*H04M 3/22* (2006.01)

(52) U.S. Cl. .............. 379/1.03; 379/24; 379/27.01; 379/29.09

(58) Field of Classification Search .......... 379/1.01, 379/1.03, 1.04, 22, 22.01, 22.03, 22.08, 23, 379/24, 29.01, 29.03, 30, 27.01, 27.08, 28, 379/29.09, 32.01; 370/241, 242, 252
See application file for complete search history.

(56) References Cited

U.S. PATENT DOCUMENTS

| | | | | |
|---|---|---|---|---|
| 6,366,644 | B1 * | 4/2002 | Sisk et al. ............... | 379/1.04 |
| 6,477,238 | B1 * | 11/2002 | Schneider et al. ....... | 379/22.04 |
| 6,487,276 | B1 * | 11/2002 | Rosen et al. ............. | 379/1.04 |
| 6,690,769 | B2 * | 2/2004 | Haines .................... | 379/22.02 |
| 6,950,497 | B2 * | 9/2005 | Drury et al. .............. | 379/14.01 |
| 7,359,330 | B2 * | 4/2008 | Lunt et al. ................ | 370/244 |
| 2003/0063712 | A1 * | 4/2003 | Chattel et al. ............ | 379/26.01 |

FOREIGN PATENT DOCUMENTS

| CA | 2 297 871 A | 8/2001 |
|---|---|---|
| WO | WO 00 64130 A | 10/2000 |
| WO | WO 02 05529 A | 1/2002 |

* cited by examiner

*Primary Examiner*—Quoc D Tran
(74) *Attorney, Agent, or Firm*—Nixon & Vanderhye, PC

(57) ABSTRACT

A method and apparatus for detecting faults on a telephone line, the method comprising: comparing measured characteristics of the line with a model, said model modeling expected characteristics of the telephone line; and in response to the comparison, generating a fault alert signal if the comparison between the measured characteristics and the modeled expected characteristics differ by more than a pre-determined threshold, wherein said characteristics comprise characteristics relating to the transmission of data on the line within a plurality of predetermined frequency bands

18 Claims, 9 Drawing Sheets

FAULT DETECTION METHOD AND APPARATUS FOR TELEPHONE LINES

This application is the US national phase of international application PCT/GB03/01359 filed 27 Mar. 2003 which designated the U.S. and claims benefit of EP 02252351.8, dated 28 Mar. 2002, the entire content of which is hereby incorporated by reference.

This invention relates to the automatic detection of faults on telephone lines.

Digital Subscriber Line (DSL) services are carried over metallic twisted copper pairs using a range of frequencies. In most DSL systems Discrete Multi Tones (DMTs) are employed with a range of frequency points being used and the data transmission distributed over these. Typically, in DMT, the available frequency spectrum in divided into 256 sub-carriers each having a frequency spacing of 4.3 kHz and carrying a sub-channel, called a "bin" or tone. Up to 16 bits are assigned to each bin. DMT encodes the bits for each bin using signal amplitude and phase shift to produce a burst for that tone. These discrete tones are then transformed into the time domain. Certain line conditions/faults that affect DSL services require advanced test tools in order to detect the problem (e.g. wide band test heads).

Current methods for determining if there is a fault on a DSL line involve manual jobs (often "poke and hope" resulting in sending out a number of engineers to fix the same problem) and expensive wide band testers. Various test tools display results (including the DMT allocation information) however such apparatus does not provide any facility to assist a user in the recognition or categorization of faults on the line from the displayed distribution.

In accordance with the invention there is provided a method of detecting faults on a telephone line, the method comprising:
  comparing measured characteristics of the line with at least one model, said model(s) modeling expected characteristics of the telephone line; and
  in response to the comparison, generating a fault alert signal if the comparison between the measured characteristics and the modeled expected characteristics differ by more than a pre-determined threshold,
  wherein said characteristics comprise characteristics relating to the transmission of data on the line within a plurality of predetermined frequency bands.

The speed of the line may be a parameter that is taken into account when forming a model. Thus, each model may model the expected characteristics of a line at a pre-determined data rate.

Preferably the comparison involves a "goodness of fit" test between the measured characteristics and the model. For example, the comparison may involve one or more of the following: calculating the Chi-squared statistic; comparing the number of zeros in pre-determined frequency bands for the measured and expected characteristics; calculating the sum of absolute difference between consecutive pre-determined frequency bands; calculating the number of pre-determined frequency bands the data for which is less than expected (e.g. less than 50% of the expected); or calculating the number of pre-determined frequency bands the data for which is greater than expected e.g. twice that expected.

In a further aspect of the invention there is provided a method of generating models for use in a method of detecting faults on a telephone line, the fault detection method comprising comparing measured characteristics of the line with a model, said model modeling expected characteristics of the telephone line, and in response to the comparison, generating a fault alert signal if the comparison between the measured characteristics and the modeled expected characteristics differ by more than a pre-determined threshold, the model generation method comprising:
  receiving data representing characteristics of a telephone line; and
  forming a model which generally represents the received characteristics of the line,
  wherein said characteristics comprise characteristics relating to the transmission of data on the line within a plurality of predetermined frequency bands.

A model may be formed for the characteristics of a line of a given type at a variety of bit rates and/or for the characteristics of a line of a given type for a subset of the pre-determined frequency bands.

In a further aspect of the invention there is provided a device for detecting faults on a telephone line, the device comprising:
  an input for receiving data from a line to be tested for faults;
  a processor for measuring characteristics of the data;
  a comparator for comparing the measured characteristics of the line with a model, said model modeling expected characteristics of a telephone line; and
  fault alert device for generating a fault alert signal in response to the comparison, if the comparison between the measured characteristics and the modeled expected characteristics differs by more than a pre-determined threshold
  wherein said characteristics comprise characteristics relating to the transmission of data on the line within a plurality of predetermined frequency bands.

The invention uses the wide band information that is a feature of the transmission system as the source of information. The invention is based upon the analysis of the way in which the DSL data transmission has been allocated to the various Discrete Multi Tones (DMTs). By analysing the allocation it is possible to identify lines that are not behaving as expected, thus indicating a possible fault condition. The technique is useful as the "overview" information (downstream loss, etc) does not pick up the "difficult" faults.

The invention relates to a method for recognizing faulty or fault-prone DSL lines, particularly those lines where faults are obscure or intermittent. The inventors have recognized, through analysis of the distribution of bit occupancy across the DMT frequencies, on Asymmetric DSL (ADSL) lines in particular, that fault-prone ADSL lines have a different distribution "profile" when compared with a fault-free line. Using standard modeling techniques, one or more model profiles of bin occupancy are generated based upon a sample of distributions gathered for lines known to be fault-free. Model profiles may be generated to represent lines (such as ADSL lines) operating at a selection of different overall downstream bit rates and of different line lengths.

One or more statistical "goodness of fit" tests may be applied to compare the bit-occupancy distribution of a particular line with one or more selected model profiles in order to identify the line as being fault-free or fault-prone, and possibly to recognize a susceptibility to particular types of fault. Statistical tests such as Chi-squared have been found to work well in comparing profiles.

The technique may be applied to any DSL service that employs DMT transmission.

The results of the comparisons would allow engineers to be dispatched to only those cases where there are genuine problems with the DSL service. It may also be possible to monitor a line over time such that an engineer could be dispatched at the point just before the problems with the line became service-affecting.

An additional application of the technique would be a final check that the line is suitable for the long-term deployment of the DSL service that has been installed.

The invention may be of interest to various segments of the telecommunications sector e.g.:
- an incumbent telco who is offering a broadband service, to see if the lines they operate are in good working order at the time of provision or, when a fault is reported, the tests may also be useful in examining if the line were degrading over time
- an operator to check the lines that they have been provided with are able to support the service they are providing and also to determine if the line is in a faulty condition when a customer reports a problem
- a DSL equipment manufacturer to add value to their products
- a test equipment manufacturer to provide a method of interpreting the DMT results In a further aspect of the invention there is provided a method of detecting faults on a telephone line, the method comprising: comparing measured characteristics of the line with a model, said model modeling expected characteristics of the telephone line, the comparison step involving a goodness-of-fit test between the measured characteristics and the modeled expected characteristics. In response to the comparison, a fault alert signal may be generated if the comparison between the measured characteristics and the modeled expected characteristics is statistically significantly different.

The comparison step may be carried out periodically over a period of time to monitor for changes in the characteristics of the telephone line over the period of time. This periodic test may give an indication of an improvement or a degradation in the performance of the line.

Results of the comparison test may be made available locally or may be sent to a central unit.

The invention will now be described by way of example only with reference to the accompanying drawings in which.

Figure 1:
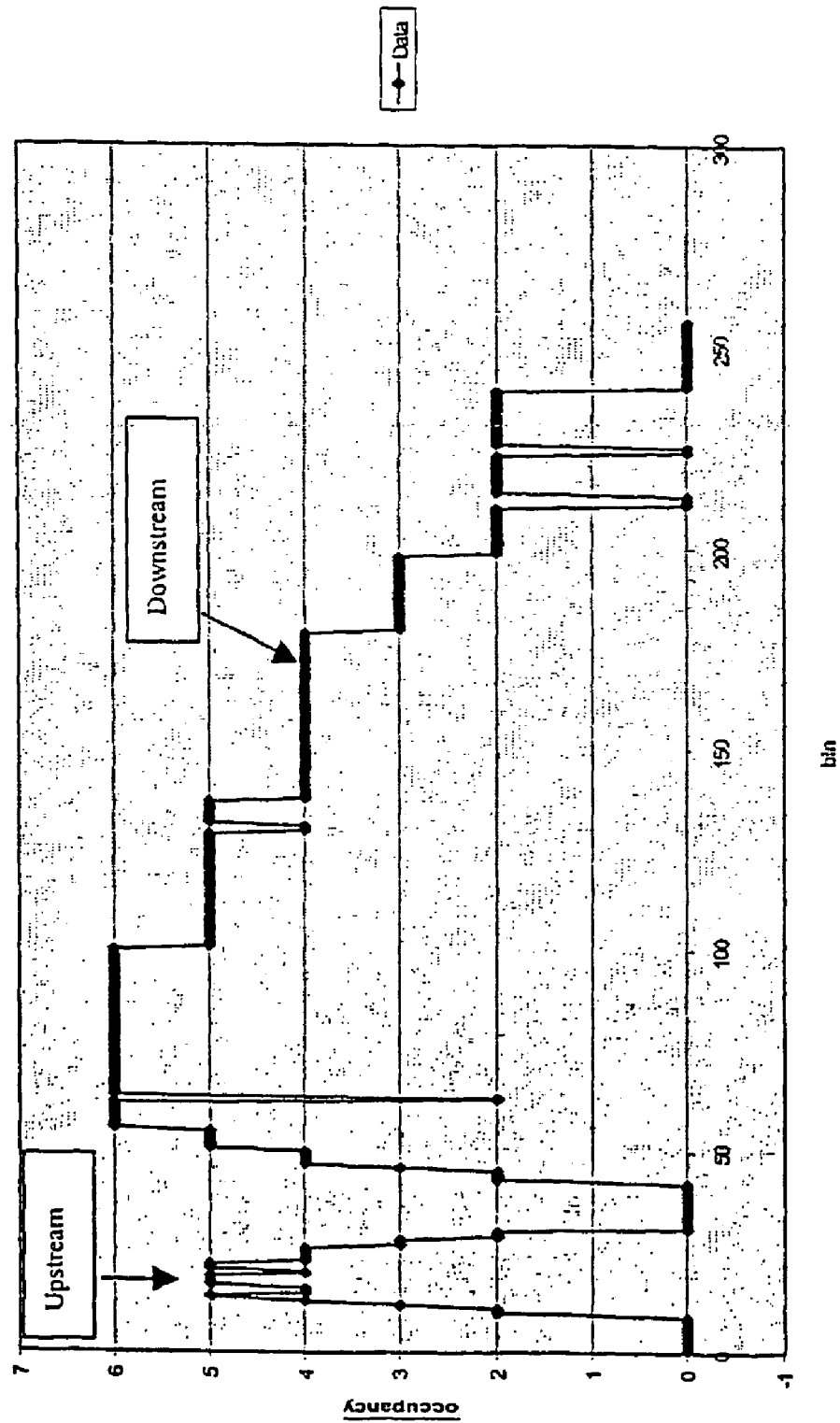
FIG. 1 shows a typical bin occupancy distribution for a Digital Subscriber Line.

The invention relates to the investigation of the characteristics of a digital subscriber line in ADSL fault diagnostics. Such characteristics may be the distribution of transmission data across a range of frequencies e.g. how the data transmission has been allocated to Discrete Multi Tones (DMT) bins or the signal to noise margin of the line. In this particular example, we will consider DMT bin allocation distribution. Algorithms embedded within the end user modem and the modem in the telephone exchange perform the allocation of the bits between the different DMT frequencies also known as bins. The exact choice of the frequency used is likely to be based on the analysis of those signals received, considering primarily the noise margin, but possibly also such factors as signal to noise ratio and loss for the frequency bins. There are many effects that can determine how a particular bin is used, these include the loss, circuit noise, impulse noise, distortion and interference on the line and also how much power is transmitted at a particular frequency and the algorithm used to determine the bin usage. The data details how the ADSL service is utilising the spread of available Discrete Multi Tone (DMT) frequencies or bins.

A set of "expected" distributions for the DMT frequency bin usage are developed for each bit rate of service seen on a particular type of line. The data for a line with possible faults are then compared with these "expected" distributions to see if a fault condition is associated with a frequency usage that deviated from the predicted allocations.

It was found that for certain cases the DMT bin usage distribution obtained when the fault was reported differed from the "expected" distribution that had been prepared, but the DMT distribution when the fault had been cleared "matched" that expected. This indicates that the technique may be useful in highlighting cases where there is an issue with the service that needs to be resolved. The data may be useful for:
- identifying faults that are the responsibility of the network owner, which could be useful for Service Level Guarantees and Quality of Service
- fault location, allowing an engineer with the appropriate skills to be dispatched
- possibly fault prediction, by monitoring the distribution over time it may be possible to pre-empt problems
- possibly identifying the End User modem used, which may be useful for Self Install products When an end-user reports a fault with a product (e.g. products such as Videostream, IP or Datastream provided by British Telecommunications plc) and the Service Provider cannot rectify it, it is passed on to the network owner to investigate.

Transmission can be influenced by issues such as the loss, noise (both circuit and impulse), distortion and interference. The amount of information that can be transmitted at a certain frequency will also depend on how much power is transmitted at that particular frequency and the algorithm used to determine the bin usage. The basic idea is the possibility that the usage of the DMT frequencies will, in general, be similar for a particular bit rate of service for lines in a good state of repair that are not subjected to sources of interference beyond those that may be expected in a telecommunications network. Any lines having DMT usage patterns that are "unusual" will have some underlying physical reason that accounts for the difference, as the modems can, to an extent, cope with certain conditions on the line. These differences may indicate an issue with the line that has to be resolved.

We will consider an ADSL system which provides 256 bins (numbered from 0→255) in which data can be carried. Bins 7→29 carry upstream data, whereas bins 38→255 carry downstream data. Each bin can hold a maximum of sixteen bits of data, although ten was the maximum number seen in a particular bin for the cases investigated. The numbers associated with the DMT bins are the numbers of bits carried in each bin, the symbol rate being 4 kHz. The frequency associated with a particular bin is the bin number times 4.3 kHz.

Initially plots were drawn of the upstream and downstream bin occupancies for all of the tests for each of the cases observed. An example of such a plot showing both the upstream and downstream bins is shown in FIG. 1. These plots showed that the upstream bin occupancy distribution was almost identical for all cases. However, the downstream bin occupancy distributions were varied. Distinct cut-offs in the bin occupancies from bin 0-6 and bin 30-37 can clearly be seen in FIG. 1. It should be noted that none of the cases seen in this study were rate adaptive and it is in the upstream direction that the adaptation of the service takes place.

The following four common downstream bit-rates 576 Kbits/s, 1152 Kbits/s, 2272 Kbits/s and 2528 Kbit/s will be considered. The two most common bit-rates in the sample were the 576 K and 2528 K bit-rates.

The upstream bin occupancy was modeled between bins 7 and 31, since the bins just out of this range held 0 bits. The modeling was done by averaging the upstream bin occupancies for the cases seen, then fitting a curve to this set of average values. The model derived from the average of the upstream bin occupancies is of the form:

$$y=-4E-06x^5+0.0004x^4-0.0148x^3+0.2362x^2-1.1408x+1.2793 \quad \text{(Equation 1)}$$

Figure 2:
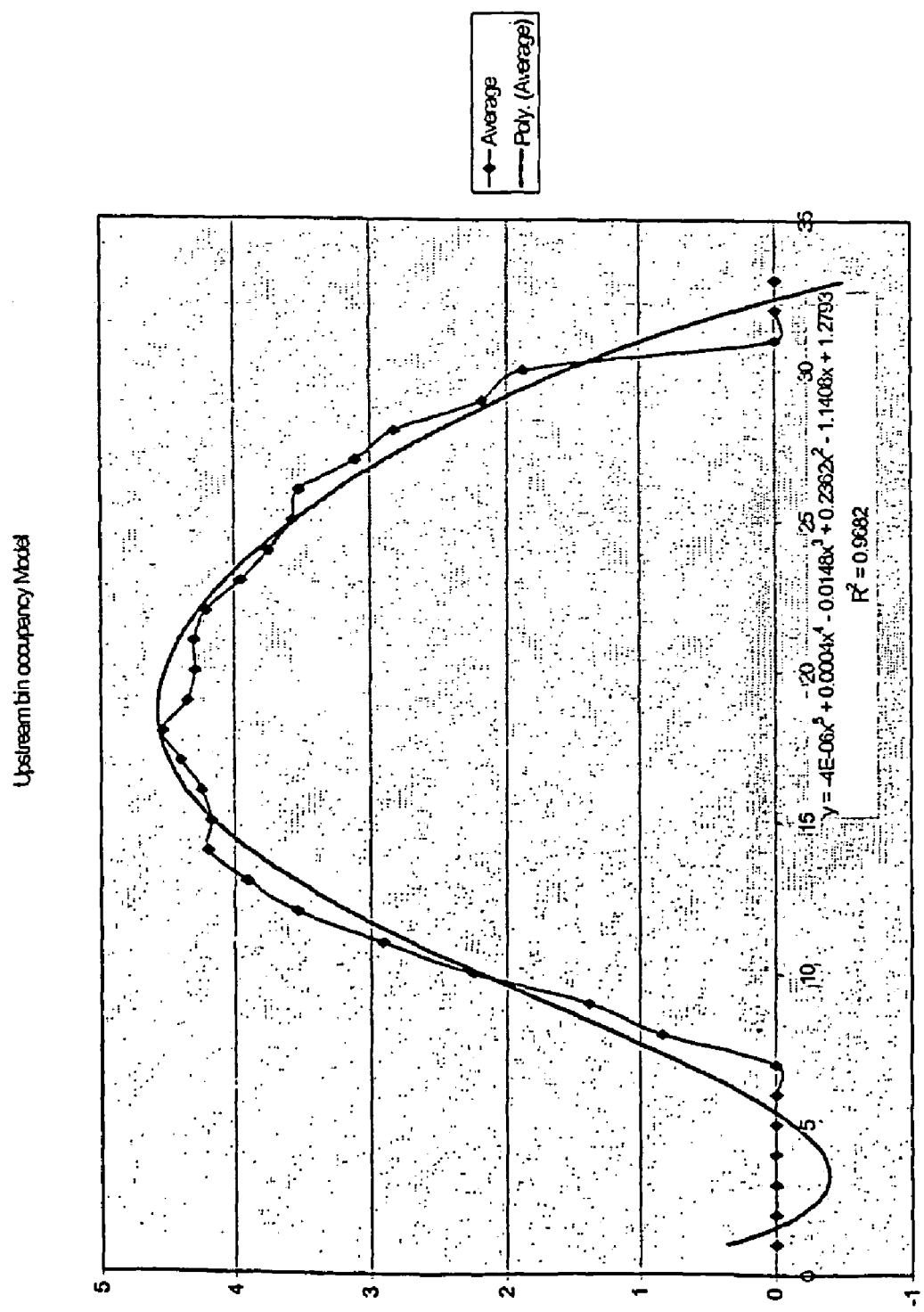
FIG. 2 is an example of a model of upstream bin occupancy.

The graph shown in FIG. 2 shows the upstream model compared to the upstream data. None of the cases seen in the data were rate adaptive and it is on the upstream section of the spectrum that the adaptation takes place. Therefore it is likely that the upstream model may not be as consistent when rate adaptation is applied and that therefore more than one model may be required to model the upstream characteristics.

From the downstream bin occupancies it was evident that the distribution of bin usage for 576 k cases appeared to be significantly different from that in the other cases. For this reason the 576 K cases were investigated separately to the non-576 K cases, since they appear to follow a different type of distribution, hence a separate "model" was required. The 576 K distribution seems to be much flatter than the others, and is generally either 0 bits or 2 bits per bin. The other distributions are much more varied in terms of the range of bits present in a bin and in the bins that were occupied.

Data Modelling

As the DMT bin allocations between the 576 K downstream cases appear to follow a different distribution to the other downstream bit rates, two "expected" distributions were calculated.

Plots were made of all the downstream bin occupancy distributions obtained. From these plots it was evident that only certain bins were used. For 576 K bit-rates this was from bin 46 to bin 200. For non-576 K bit-rates this was from bin 38 to bin 255 (all of the possible downstream bins were used, as 255 is the maximum number of bins). Bins out of these ranges either had zero bits or were associated with upstream traffic.

When calculating the expected DMT bin allocation, data from telephone lines that are considered fault-free are used. A method of manual, subjective selection may be used in selecting the cases that are to be used to generate the models.

The aim of the data modeling exercise is to produce "general expected" DMT bin allocations for a particular type of line/bit rate/line length that could be used for overall comparison with the distributions that are actually observed on test lines.

The details of how the expected distributions were obtained will now be described for the 576 k bit rate and for the Non-576 k bit rate. The equations that describe the expected down stream distributions are summarised below.

Downstream Data Fit for 567 k Cases

The data used to calculate the expected DMT bin allocation for the 576 k cases was measured from a plurality of telephone lines which were fault-free.

To model the 576 K bit-rate cases, the average bin occupancy for each bin was taken, plotted, and a trend-line fitted. The resulting trend-line that was fitted to the average was used as the model, "expected" downstream bin occupancy distribution for the 576 K bit-rate.

Figure 3:
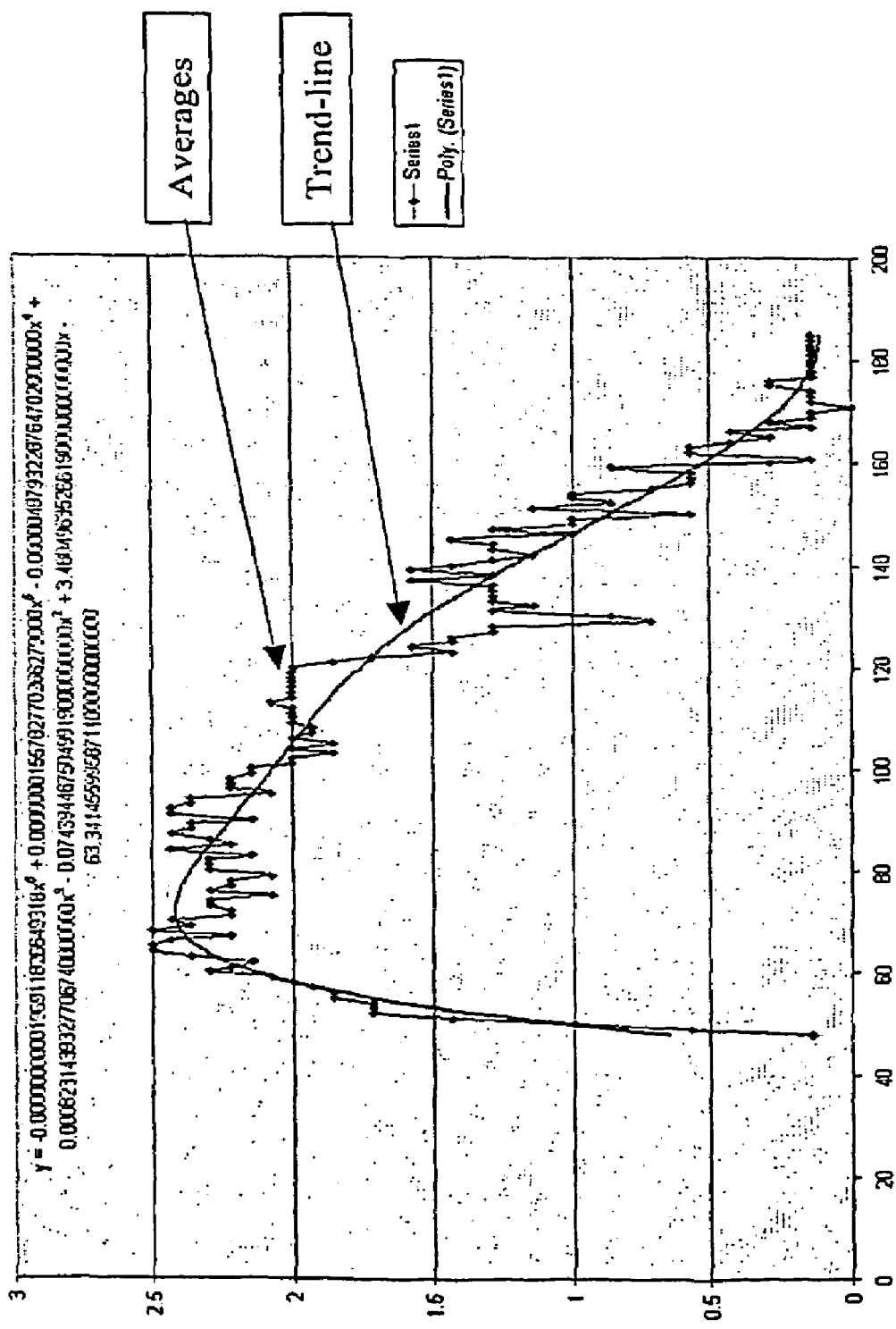
FIG. 3 is an example of the average bin occupancies for "healthy" cases for the 576 K bit-rate, with the fitted trend-line and equation.

The average bin occupancies, along with the trend line, were plotted against the bin number to produce FIG. 3.

To model the bin occupancy distribution, a $6^{th}$ order polynomial trend-line was deemed to be the best model to use after "eyeballing" the different fits.

An example of the expected model calculated from 576 K bit-rate bin occupancies is of the form of a $6^{th}$ order polynomial equation:

$$y=-1.969E-11x^6+1.558E-08x^5-4.979E-06x^4+8.231E-04x^3-7.439E-02x^2+3.480E+00x-6.334E+01 \quad \text{(Equation 2)}$$

The fitted model gives the expected bin occupancies for each bin. By comparing the bin occupancies for a particular case to this fitted model, it should be possible to determine whether the service in question is "healthy" or not.

Downstream Data Fit for Non-567 k Cases

As the non-576 K bit-rate cases dealt with a range of downstream bit rates, and hence range of expected values in the various DMT bins, a different procedure was followed from the 576 K bit-rate described above. As these different bit rates had the same general "shape" the normalised distributions were calculated first, so all the values in the various DMT bins were of a similar range. This then meant that the resultant "normalised" distribution had to be "scaled" according to the downstream bit rate of the service being considered.

The bin occupancies for each reading taken on each fault-free line were normalised as a fraction of the total sum of the bin occupancies for that test. The average normalised occupancy for each bin was then calculated over all of the cases considered. The normalised DMT bin usage values were calculated as a fraction of the total sum of bits for each bin distribution. Again not all the DMT bin usage starts at exactly the same point, however, as explained in relation to the 567 k case, the aim was to obtain a general expected distribution. From these normalised bin occupancies an average across all of the DMT distributions was calculated.

A trend-line was fitted to this averaged data. Again, a $6^{th}$ order polynomial model was observed "by eye" to be the most appropriate to use. The expected normalised model calculated from the non-576 K bit-rate bin occupancies is of the form of a $6^{th}$ order polynomial equation:

$$y=-8.264E-15x^6+7.861E-12x^5-3.016E-09x^4+5.960E-07x^3-6.392E-05x^2+3.477E-03x-6.608E-02 \quad \text{(Equation 3)}$$

Figure 4:
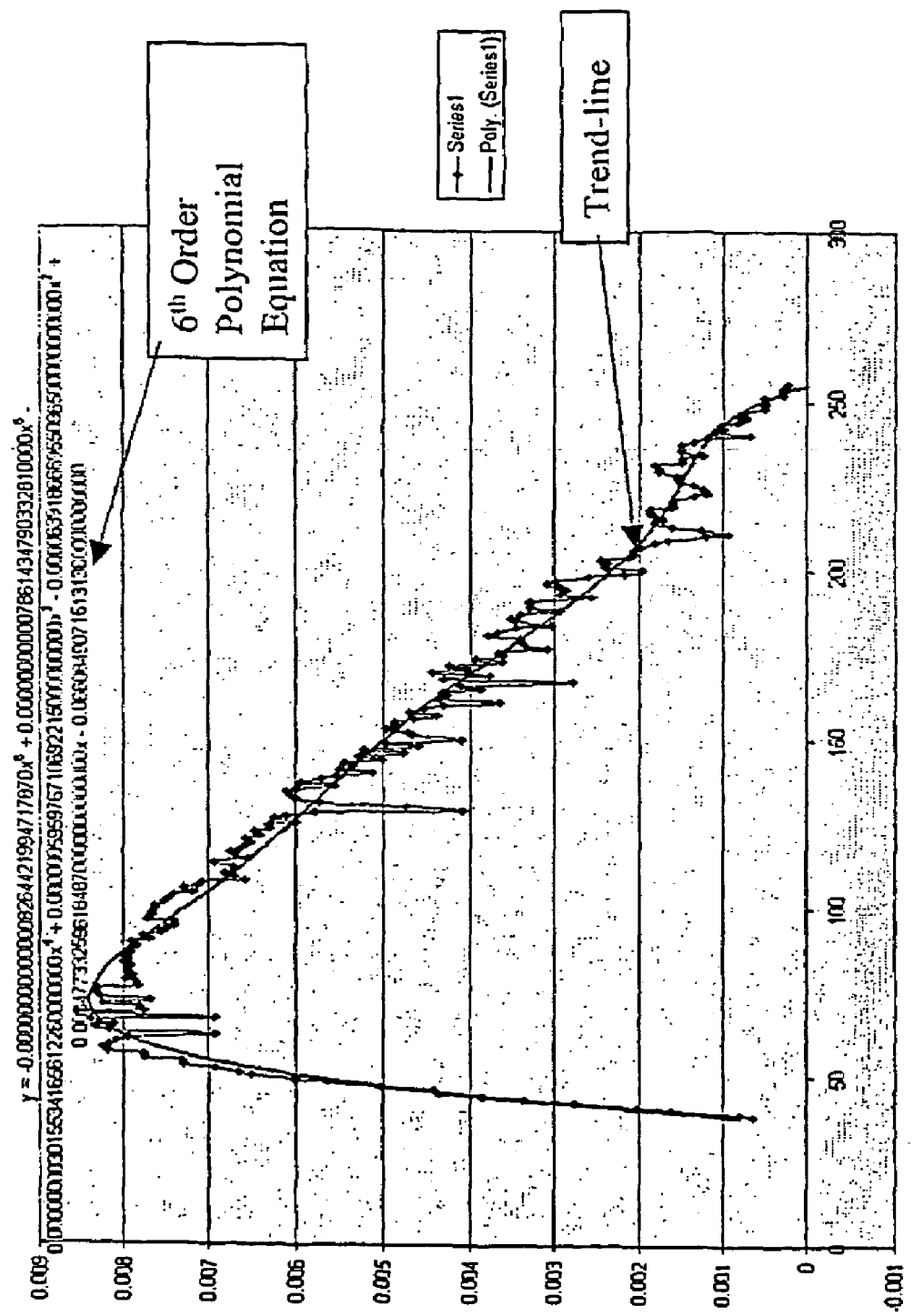
FIG. 4 is a plot showing normalised average bin occupancy against bin number, with fitted trend-line.

A plot of the normalised average bin occupancies against the bin number, along with the trend-line that was fitted, is shown in FIG. 4. FIG. 4 shows that the trend-line fits the downstream-normalised bin occupancy distribution closely, though it is interesting to note that there are distinct "bites" out of the normalised bin occupancy distribution at certain frequencies.

In order to "scale" this "normalised" polynomial fit according to the bit-rate concerned (1172K, 2272K or 2528K), a linear model was used to model the sum of all the downstream bits for each distribution against the bit-rate.

The Excel regression analysis tool was used on the bit-rate to generate a linear model. Effectively the use of the linear model allowed a scaling factor for the model distribution to be calculated. From the regression output the gradient and intercept of the linear model was taken and plotted with the data on the distributions being modeled. The linear model used to scale the normalised model for non-576 K cases is of the form:

$$Y = 0.328575638x - 41.50589785 \quad \text{(Equation 4)}$$

From the linear model and the polynomial model the expected bin occupancies for each of the downstream rates could be calculated. Table 1 gives an example of the calculation for a subset of the bins.

TABLE 1

How the expected bin occupancies were calculated

| Rate | 1152 | 2272 | 2528 | Bin sums from linear model |
|---|---|---|---|---|
| Bin |  | 337.0132367 | 705.0179509 | 789.1333141 |
| 38 | 0.000702971 | 0.236910677 | 0.495607478 | 0.554738175 |
| 39 | 0.001274711 | 0.429594344 | 0.898693853 | 1.005916598 |
| 40 | 0.001813495 | 0.611171851 | 1.278546595 | 1.431089394 |
| 41 | 0.002320656 | 0.782091905 | 1.636104378 | 1.831307229 |
| 42 | 0.002797488 | 0.94279041 | 1.9722791 | 2.207590801 |
| 43 | 0.003245246 | 1.093690707 | 2.287956369 | 2.560931377 |
| 44 | 0.003665149 | 1.235203792 | 2.583995973 | 2.892291328 |
| 45 | 0.004058382 | 1.367728548 | 2.861232359 | 3.202604659 |
| 46 | 0.004426093 | 1.491651968 | 3.1204751 | 3.492777531 |

Bin number substituted into polynomial equation

Polynomial answer * bin

Figure 5:
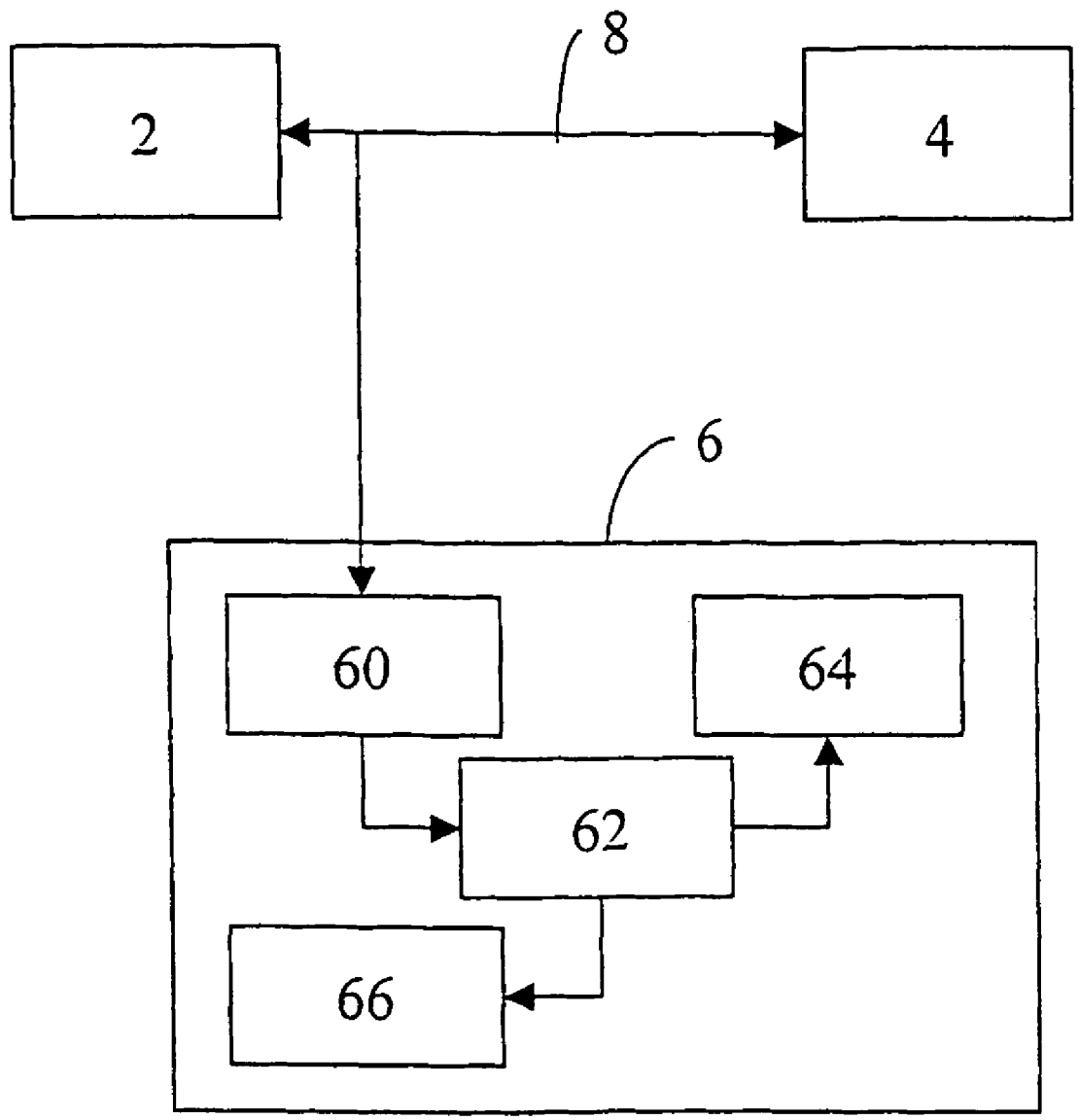
FIG. 5 shows an embodiment of a fault detection device according to the invention and a typical system with which the fault detection device is to be used.

FIG. 5 shows an example of part of a telecommunications network. A local exchange 2 and a network terminating equipment 4 at a user's premises are connected by a digital subscriber line 8. Data is transmitted over the DSL between the local exchange 2 and the terminal equipment 4 such as a modem. Fault detecting apparatus in accordance with the invention is indicated by 6. The fault detection apparatus includes a line characteristic measurer 60 for measuring data transmitted on the DSL line 8 and outputting the data in a required form. For example, in a preferred embodiment of the invention, the line characteristic measure of 60 measures the DMT bin occupancy for the line 8.

This data is input into a data analyser 62 which carries out a comparison between the output of the measuring component 60 and data models stored in the analyser 62. As described above, these models model the expected line characteristics for the particular type of line. The fault detection device also includes a display 64 and an audible alert generator 66. The analyser may therefore display on the display 64 the measured characteristics, the model characteristics and the results of the "goodness of fit" test carried out by the analyser. The analyser may also be arranged to send a signal to the audio alert 66 to cause the fault detection device 6 to produce an audible alert when the results of the comparisons carried out by the data analyser 62 indicate that a faulty line exists.

Statistical Analysis of Measured Data

How the models may be generated has been explained above. We will now consider how these models may be used. In use, the expected bin occupancies represented by the models are compared with the actual bin occupancies observed for a line under test and statistical analyses performed to determine if the data for each test case follow the "expected" distribution.

For each tested line, a graph is drawn showing the actual measured data and the modeled allocation of data over the downstream bins. To more formally analyse the data and assign numerical values to the differences between the observed and expected data allocations, a "goodness of fit" is also determined. The following techniques were investigated for a "goodness of fit" test.

"Chi Squared" type test

Count of the number of observed bins with zero bits allocated to it, when expecting a value greater than 1 to have been allocated from the model distribution Sum of the absolute differences between the numbers allocated to adjacent bins across the whole observed downstream range Count of where actual allocation in a bin was less than half of that predicted from the idealised distribution for that bin Count of where actual allocation in a bin was more than twice that predicted from the idealised distribution for that bin These tests were chosen after observing the actual distributions of downstream data over the various bins obtained and attempting to formulate a numerical method for describing the deviations from the expected distributions that were seen.

The tests represent an attempt to develop a sequence of values that can be calculated that capture the types of deviations that were observed by eye. The modems aim to train up in such a way as to overcome problems with the line and are able, to an extent, to cope with lines in a "poor" state as a consequence of this ability to select how much data is carried at a certain frequency. Having the ability to highlight cases where the distributions differ from that expected could allow those lines with underlying physical problems to be identified. The above techniques provide a number of methods for identifying distributions that differ from that expected.

Test 1: "Chi Squared" Type Test

The standard Chi squared statistical test was adapted to be used to test whether there was a "significant difference" between the overall observed and "modeled" DMT bin occupancy allocation. The value calculated for the Chi squared test is given in Equation 5.

$$\sum \frac{(\text{observed} - \text{expected})^2}{\text{expected}} \quad \text{(Equation 5)}$$

Ideally for a Chi squared test the number of expected values in a particular category should be greater than or equal to five. If the expected number is less then this, then neighbouring categories should be combined. In order to process the data in this trial, neighbouring bins had their values from the "expected" DMT bin occupancy distribution summed so that the totals over a particular range of bins for a particular bit rate were always more than one and most were more than five. The totals over the same range of bins from the observed distributions were taken to compare with these values. It should be noted that strictly speaking the Chi squared approximation is only valid if less than 20 percent of the expected values from the original distribution are less than five and none is less than one. However, the real purpose of this test was not a "scientific" determination of a difference between the observed and expected distribution, more a logical test (with a numeric value) to determine if an observed distribution was "different".

The number of groups into which the expected values were gathered for the Chi squared tests for each of the different bit rates is given in table 3.1. The reason why different groupings were required was that the expected allocations for a particular DMT bin for the lower bit rates were usually lower than those for the higher bit rates.

As a result, more DMT bins had to be grouped in order to obtain a value that was in the range required.

TABLE 3.1

Number of groups for the Chi-squared tests for the different bit rates of service.

| Bit Rate (Kbits) | Number of "groups" for Chi-squared test |
|---|---|
| 576 | 33 |
| 1152 | 52 |
| 2272 | 108 |
| 2528 | 108 |

To group the data, the expected values over a consecutive range of DMT bins were summed until the combined value lay in the range 4.9 to 11.1. There were two exceptions to this:
576 Kbit final group which extended from DMT bin 187 to 200 and had a total of 1.15
1152 Kbit final group which extended from DMT bin 242 to 255 and had a value of 3.5

It was felt that the final ranges for the 576 and 1152 Kbit rates were quite extended and combining them with the adjacent group would mask some of the variation that was occurring in the distributions.

The same groupings were used for the 2272 and 2528 bit rates to ease processing.

The test was carried out at both 1% and 5% significance levels. Those cases where the difference was significant at one or more of these levels were classed as "rogue" distributions.

Equation 5 gives the calculated statistic from the data, which is compared against a test statistic, which can be derived from the Excel function CHIINV for the significance levels used as shown below $=CHIINV(0.05,df)$ or $=CHIINV(0.01,df)$ where 0.05 and 0.01 are the significance levels (5% and 1% respectively) and df is the number of degrees of freedom. Two levels were selected to investigate what level the test should be conducted at to highlight those cases that were observed "by eye" to be different than those expected. The levels also correspond to the "standard" levels at which distributions are often tested. The result of the Chi-squared test may be provided on the display 64.

Test 2: Zero Downstream Bins

The purpose of this test was to detect cases where the downstream bin occupancy distribution had several zero bit bins, where it was expected that they should not be zero.

Figure 6:
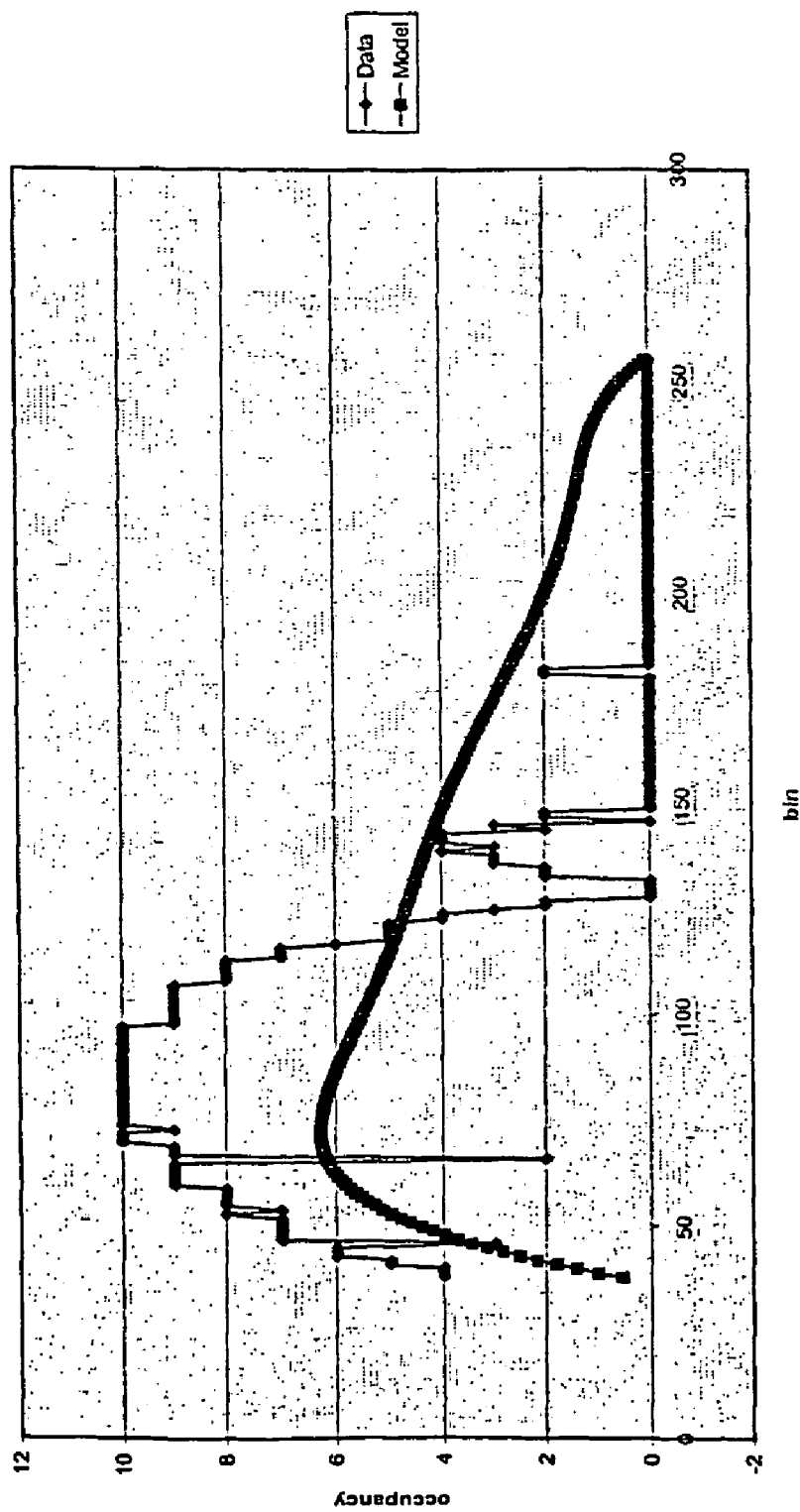
FIG. 6 is an example bit occupancy distribution that may be shown to be unusual by the use of the zero downstream bins statistic.

The statistic was calculated over the range of bins where the expected model predicted a value greater than one for the bin concerned, and used the Excel formula $=IF(\text{observed bin}=0,1,0)$ This simply provides the number of occasions in which the bin occupancy drops to 0 when not expected to. This could potentially be an indication of problems with the line if there is a high number of downstream bins with 0 occupancy. An example of the type of distribution where such a test could be useful is given in FIG. 6. This zero downstream bin statistic would make it easy to identify "unusual" distributions such as that in FIG. 6 because of the large number of 0 bit bin occupancies from bin 150 onwards. This test may be particularly useful when used in conjunction with the Chi squared test. The results of the test may be displayed in the display 64.

Test 3: Absolute Differences

Figure 7:
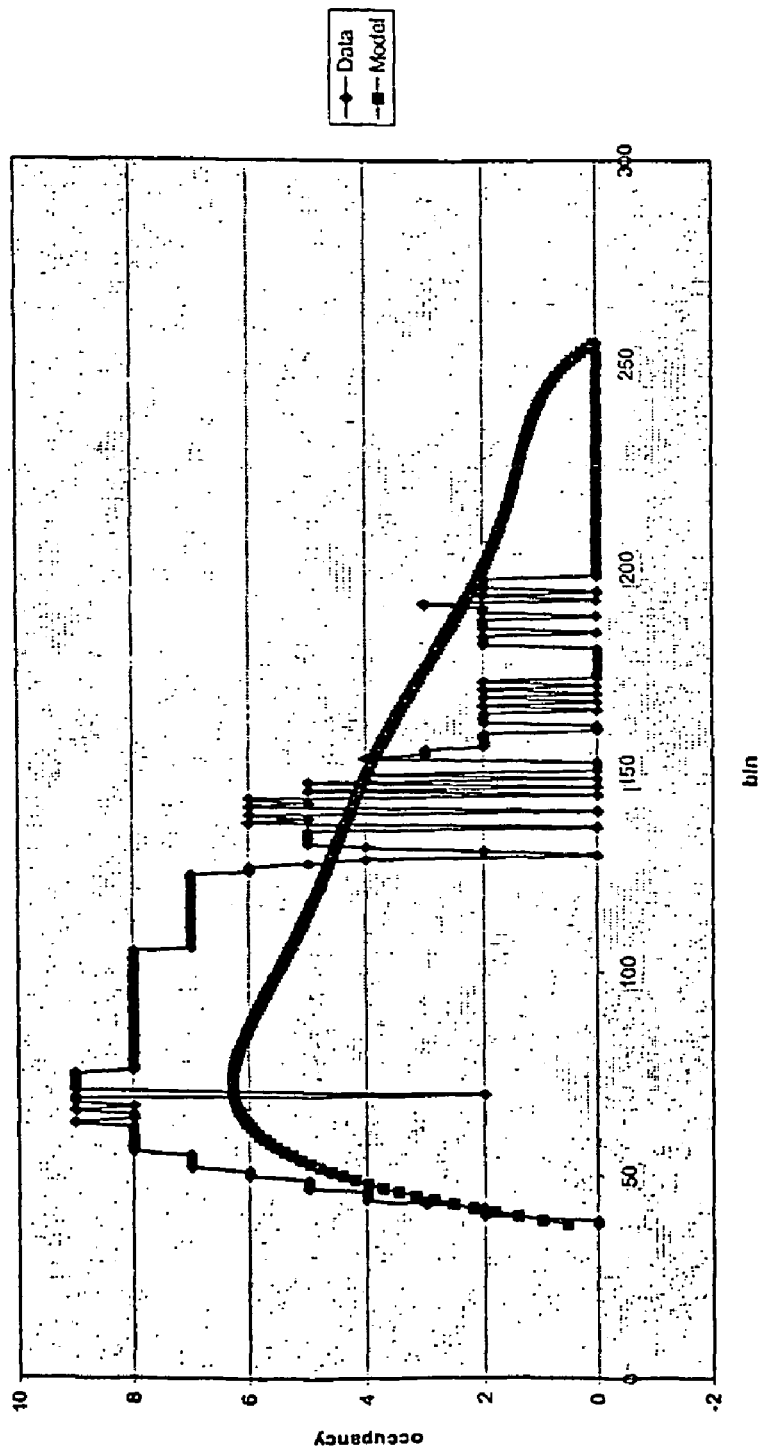
FIG. 7 is an example bit occupancy distribution where the use of the absolute difference statistic shows the measured and expected characteristics.

The purpose of this test is to detect "jitteriness" in the downstream bin occupancies, as identified in FIG. 7. The distribution in FIG. 7 exhibits "jitteriness" from around bin 125 to bin 200. This test represents another method for identifying a type of deviation from the expected distribution that was observed.

This test simply sums the absolute difference between consecutive bins. The formula used is $=ABS(\text{bin39}-\text{bin38})$ $=ABS(\text{bin40}-\text{bin39})$ $=ABS(\text{bin41}-\text{bin40})$

...

etc.

These differences are then summed up for each PSID. In order to compare differences between different bit-rates, a form of standardisation was needed, since with higher bit-rates, higher differences could be expected, due to the larger number of bits in a particular DMT bin.

The following normalised difference statistic was used:

$$\text{statistic} = \frac{\text{sum(adjacent bin differences)}}{\text{sum(bits)}} * 100$$

The difference statistic calculated for the data shown in FIG. 7 was 19.84, compared to a value around 6 from most "healthy" looking distributions. The result of the test may be provided in display 64.

Test 4: Less than Half's

Figure 8:
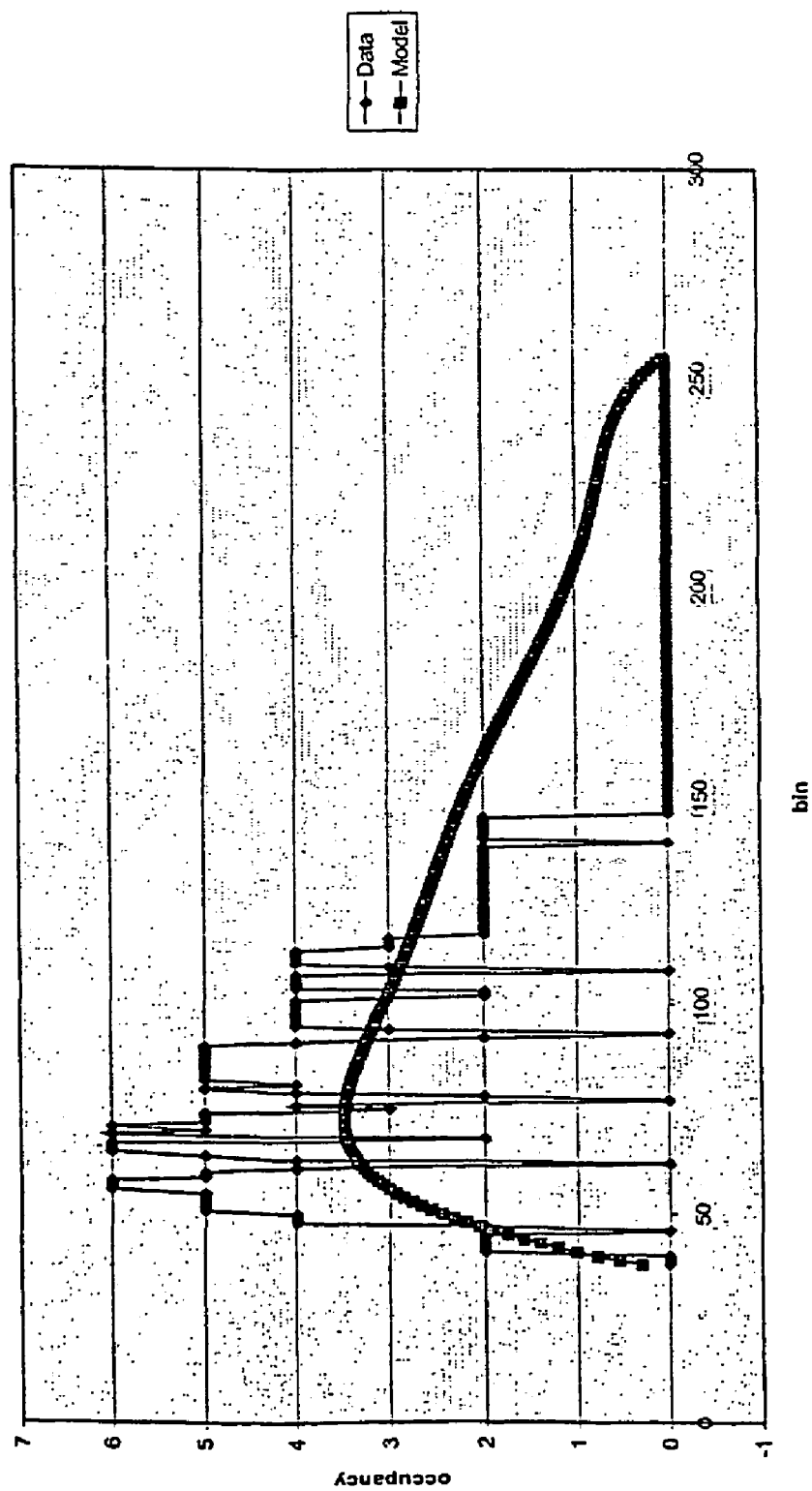
FIG. 8 is an example bit occupancy distribution using the "less than half" statistic.

This test was designed to detect particularly low observed bin occupancies. The formula is $=IF(\text{observed bin}<0.5*\text{expected bin},1,0)$ The "less than half" statistic picks up the "drop-off" in the distribution. The statistic for the particular test in FIG. 8 is 119, mainly due to the total lack of bin occupancy after bin 145. Normally, the "less than half" figure is of the order of 20-25. The result of the test may be provided in the display 64.

Test 5: More Than Twice

Figure 9:
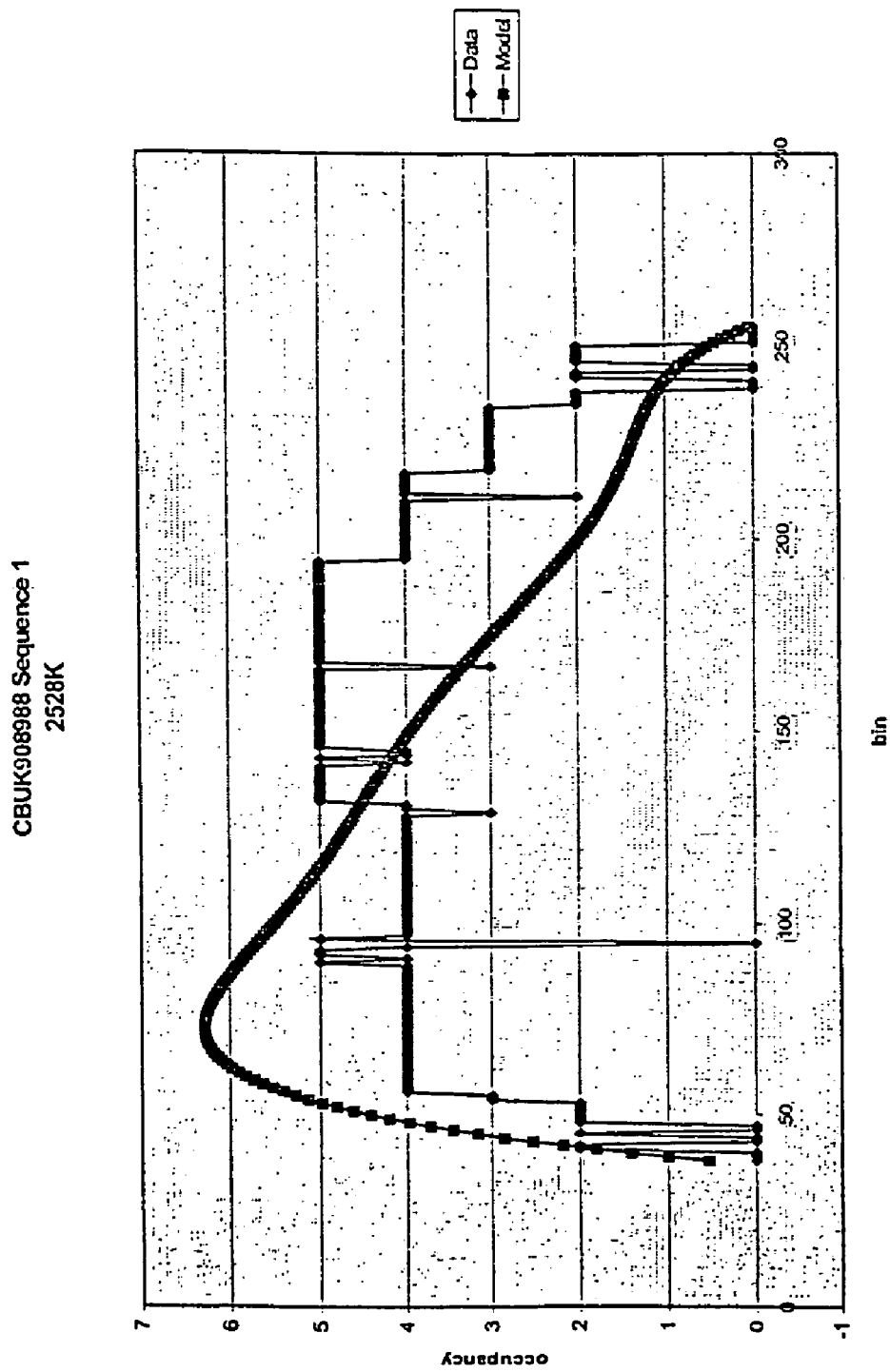
FIG. 9 is an example bit occupancy distribution that may be shown to be unusual using the "more than twice" statistic.

This test detects particularly high bin occupancies, which can be caused when the observed distribution becomes skewed. The formula is $=IF(\text{observed bin}>2*\text{expected bin},1,0)$ This "more than twice" statistic is able to highlight when the allocation is "skewed" towards higher frequency bins in the distribution of the DMT bin usage. An example of the situation is shown in FIG. 9. The more than twice statistic for the particular case in FIG. 9 is 45. For the majority of the fault-free lines this statistic is in the range zero to five. The results of the test may be provided on display 64.

Results

The measurements and statistics described above are calculated for each line to be tested and these are compared to the plots to provide clear information for each case, which can then be reviewed by a skilled engineer. Alternatively the fault detecting device 6 may be arranged to send an automatic fault alert to a central unit to log the fault.

The comparison test results may be provided separately or in a combined manner. For instance, the data output from the fault detection device may comprise separate reading for all the above tests. Additionally or alternatively, the fault detection device may carry out further data processing to combine the results of the individual tests into a single reading.

Distributions different from those expected may indicate an issue with the line that other tests can not highlight. Indeed, for some of the faults examined, only the system according to the invention indicated that there was an issue with the line, as all the other tests returned values within the expected range.

It has been demonstrated that the line data contains information that reflects line and equipment conditions. The invention provides a diagnostic tool that takes this data and carries out the tests with respect to the appropriate models for the bit rate of the line.

As there appears to be the potential for the line data to be used in fault diagnostics, it is envisaged that this information be made available for all lines.

The above description refers to particular bit rates considered. It will be appreciated however by a person skilled in the art that these bit rates are merely exemplary and have no limiting effect on the invention. The invention is applicable to lines having different bit rates, lengths, types and (e.g. twisted copper pairs or fiber optics) etc. The data analyser 62 may include any models deemed appropriate for the testing of the lines. Equally the particular characteristic of bin occupancy for a line has been described above. However it will be cleared to person skilled in the art that other line characteristics may be considered for instance signal to noise margin for a line.

Other modifications and variations of the invention will be apparent to a person skilled in the art on reading this description and it is intended these fall within the scope of the invention.

The invention claimed is:

1. A method of detecting faults on a digital subscriber line, the method comprising
   comparing measured data transmission characteristics of the digital subscriber line with at least one model, said model(s) modelling expected data transmission characteristics of the digital subscriber line; and
   in response to the comparison, generating a fault alert signal if the comparison between the measured data transmission characteristics and the modelled expected data transmission characteristics differ by more than a pre-determined threshold,
   wherein said data transmission characteristics comprise characteristics relating to the transmission of data on the line within a plurality of predetermined frequency bands representing the bin occupancy distribution of discrete multi tones.

2. A method according to claim 1 wherein a model models the expected characteristics at a pre-determined data rate associated with the digital subscriber line.

3. A method according to claim 1 wherein the comparison involves a goodness-of-fit test.

4. A method according to claim 3 wherein the comparison involves calculating the Chi-squared statistic.

5. A method according to claim 3 wherein the comparison involves comparing the number of zeros in said pre-determined frequency bands for the measured and expected characteristics.

6. A method according to claim 3 wherein the comparison involves calculating the sum of absolute difference between consecutive said predetermined frequency bands.

7. A method according to claim 3 wherein the comparison involves calculating the number of said pre-determined frequency bands the data for which is less than expected.

8. A method according to claim 7 wherein the comparison involves calculating the number of said pre-determined frequency bands the data for which is less than 50% of the expected.

9. A method according to claim 3 wherein the comparison involves calculating the number of said pre-determined frequency bands the data for which is greater than expected.

10. A method according to claim 9 wherein the comparison involves calculating the number of said pre-determined frequency bands the data for which is 200% of the expected.

11. A method according to claim 1 wherein the characteristics of the digital subscriber line represent the frequency distribution for data transmitted via the digital subscriber line.

12. A method of generating models for use in a method of detecting faults on a digital subscriber line, the fault detection method comprising comparing measured data transmission characteristics of the digital subscriber line with a model, said model modelling expected data transmission characteristics of the digital subscriber line, and in response to the comparison, generating a fault alert signal if the comparison between the measured data transmission characteristics and the modelled expected data transmission characteristics differ by more than a pre-determined threshold, the model generation method comprising:
    receiving data representing data transmission characteristics of a digital subscriber line; and
    forming a model which generally represents the received data transmission characteristics of the digital subscriber line,
    wherein said data transmission characteristics comprise characteristics relating to the transmission of data on the line within a plurality of predetermined frequency bands representing the bin occupancy distribution of discrete multi tones.

13. A method according to claim 12 further comprising forming a model for the data transmission characteristics of the digital subscriber line at a variety of bit rates.

14. A method according to claim 12 further comprising forming a model for the data transmission characteristics of the digital subscriber line for a subset of said pre-determined frequency bands.

15. A device for detecting faults on a digital subscriber line, the device comprising:
    an input for receiving data from a digital subscriber line to be tested for faults;
    a processor for measuring data transmission characteristics of the data;
    a comparator for comparing the measured characteristics of the digital subscriber line with a model, said model modelling expected data transmission characteristics of a digital subscriber line; and
    fault alert device for generating a fault alert signal in response to the comparison, if the comparison between the measured data transmission characteristics and the modelled expected data transmission characteristics differs by more than a pre-determined threshold, wherein said data transmission characteristics comprise characteristics relating to the transmission of data on the line within a plurality of predetermined frequency bands representing the bin occupancy distribution of discrete multi tones.

16. A method for monitoring quality of a digital subscriber line, the method comprising:

comparing measured data transmission characteristics of the digital subscriber line with a model, said model modelling expected data transmission characteristics of the digital subscriber line, the comparison step involving a goodness-of-fit test between the measured data transmission characteristics and the modelled expected data transmission characteristics, wherein said data transmission characteristics comprise characteristics relating to the transmission of data on the line within a plurality of predetermined frequency bands representing the bin occupancy distribution of discrete multi tones.

17. A method according to claim 16 wherein, in response to the comparison, generating a fault alert signal if the comparison between the measured data transmission characteristics and the modelled expected data transmission characteristics is statistically significantly different.

18. A method according to claim 16, further comprising periodically carrying out the comparison step over a period of time to monitor for changes in the data transmission characteristics of the digital subscriber line over the period of time.

* * * * *